United States Patent [19]

Coffinberry

[11] Patent Number: 4,749,332
[45] Date of Patent: Jun. 7, 1988

[54] METHOD AND APPARATUS FOR DEGRADING ANTIMISTING FUEL

[75] Inventor: George A. Coffinberry, West Chester, Ohio

[73] Assignee: General Electric Company, Cincinnati, Ohio

[21] Appl. No.: 816,960

[22] Filed: Jan. 8, 1986

Related U.S. Application Data

[60] Continuation of Ser. No. 625,269, Jun. 27, 1984, abandoned, which is a division of Ser. No. 370,238, Apr. 21, 1982, Pat. No. 4,474,530.

[51] Int. Cl.$^4$ .............................................. F01D 1/12
[52] U.S. Cl. .................... 415/55; 415/53 T; 415/143; 415/206
[58] Field of Search ............... 415/53 R, 54, 55, 56, 415/57, 58, 52, 206, 143, 219 R; 60/39.464; 44/62

[56] References Cited

U.S. PATENT DOCUMENTS

| | | | |
|---|---|---|---|
| 603,384 | 5/1898 | Maurer | 415/53 R |
| 1,452,619 | 4/1923 | Speed | 415/53 R |
| 2,073,014 | 3/1937 | Jennings | 415/203 |
| 2,413,796 | 1/1947 | Sprouse | 415/56 |
| 2,471,174 | 5/1949 | Trumpler | 415/53 |
| 3,128,051 | 4/1964 | Smith | 415/183 |
| 3,397,864 | 8/1968 | Sprouse et al. | 415/202 |
| 3,628,882 | 12/1971 | Nilsson | 415/119 |
| 3,784,318 | 1/1974 | Davis | 415/158 |
| 4,371,310 | 2/1983 | Henry IV, et al. | 415/211 |
| 4,417,851 | 11/1983 | Cygnor et al. | 415/150 |
| 4,474,530 | 10/1984 | Coffinberry | 415/213 T |
| 4,619,581 | 10/1986 | Lewis et al. | 415/206 |

Primary Examiner—Robert E. Garrett
Assistant Examiner—John Kwon
Attorney, Agent, or Firm—Derek P. Lawrence

[57] ABSTRACT

A centrifugal pump is provided for degrading antimisting fuel. The centrifugal pump has a rotary impeller closely surrounded by a vaned diffuser for receiving fuel therefrom. The diffuser includes a plurality of recirculation channels disposed along its inner circumferential surface for directing some of the fuel which passes from the impeller to the diffuser back to the impeller for enhancing the degradation of the fuel. Other embodiments are disclosed.

12 Claims, 2 Drawing Sheets

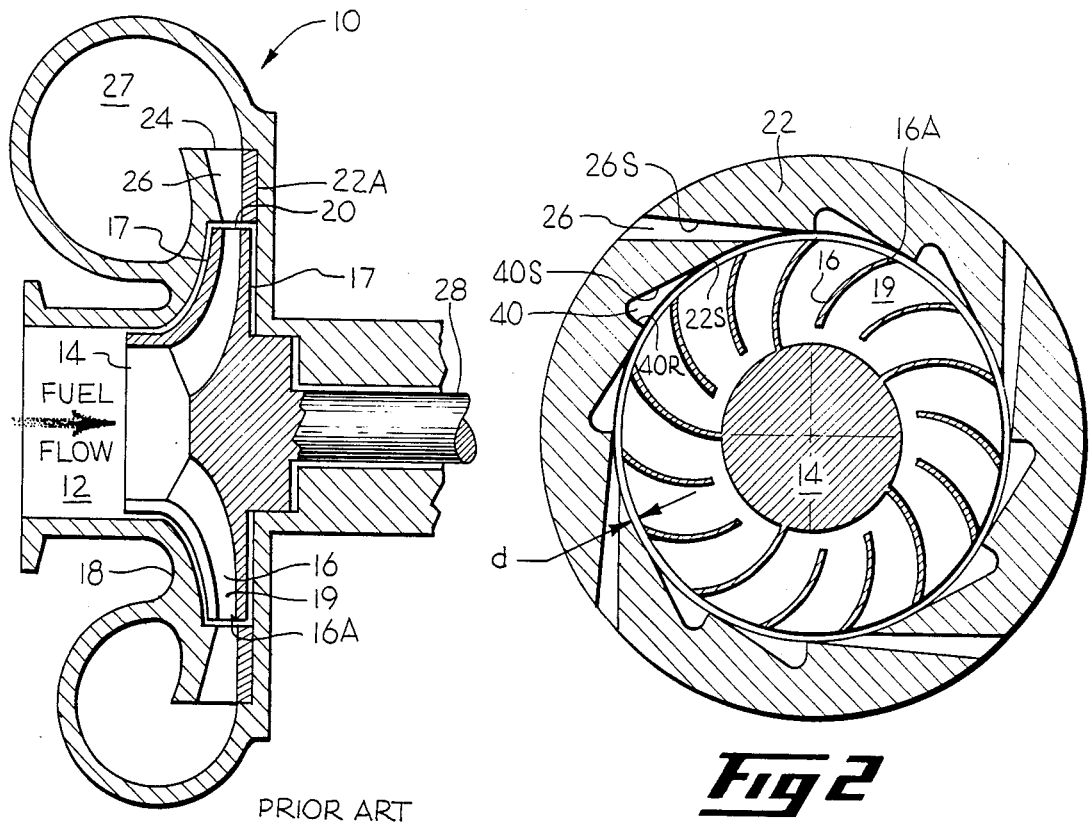
Fig 1 PRIOR ART
Fig 2
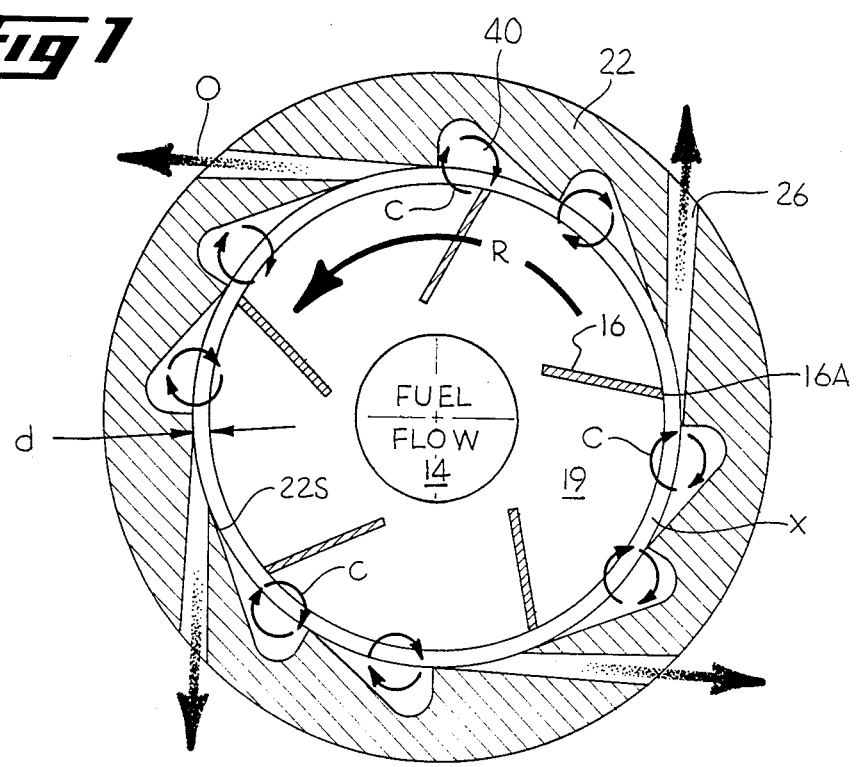
Fig 3

METHOD AND APPARATUS FOR DEGRADING ANTIMISTING FUEL

The invention herein described was made in the course of, or under, a contract with the Department of Transportation.

This is a continuation of application Ser. No. 625,269, filed June 27, 1984, now abandoned, which is a division of application Ser. No. 370,238, filed Apr. 21, 1982, now U.S. Pat. No. 4,474,530, issued Oct. 2, 1984.

BACKGROUND OF THE INVENTION

The present invention relates to method and apparatus for degrading antimisting fuel, and more particularly, to such method and apparatus employing a centrifugal pump.

Interest in the use of engine fuels in gas turbine engine applications, e.g., aircraft engines, as a means to control or reduce crash and postcrash fire fatalities has resulted in development of antimisting fuel. The antimisting fuel typically comprises kerosene containing an additive which alters the fuel to provide long-chain molecule polymers. These long-chain molecule polymers provide the fuel with the ability to resist the tendency to mist and ignite in the event of crash or postcrash tank or fuel line rupture.

However, in order for such antimisting fuel to be properly ignited and burned in the engine combustor, it is necessary to degrade the fuel back to its original kerosene molecule structure. In addition, due to the non-Newtonian and highly viscous characteristic of the antimisting fuel, it is also necessary to degrade the antimisting fuel in order to provide satisfactory heat transfer in the engine heat exchangers generally associated with gas turbine engine applications. It is also desirable to degrade the antimisting fuel to ensure predictable leakage in fuel metering components and to avoid blockage of fuel filters.

Centrifugal pumps are well known in gas turbine engine technology. For example, an exemplary centrifugal pump is described in U.S. Pat. No. 3,784,318, entitled "Variable Diffuser Centrifugal Pump," assigned to the assignee of the present application, and hereby incorporated into reference in the present application. Such centrifugal pumps typically have a rotary impeller closely surrounded by a collector, e.g., a vaned diffuser, with the impeller having an input for receiving fuel and an output for directing the fuel therefrom into an input of the surrounding collector. Such centrifugal pumps are capable of pumping fuel at the pressure and flow levels, e.g., typically about 1000 psi (pounds per square inch) and 16000 pph (pounds per hour), respectively, required for many gas turbine engine applications. In addition, such pumps must operate at required speed ranges in the order of about 25000 rpm.

In order to employ such a centrifugal pump with antimisting fuel, however, additional means must be provided for degrading the antimisting fuel as conventional centrifugal pumps provide either no degrading capability or unacceptably insufficient degrading capability. Thus, it has been proposed to add degrading structures e.g., throttling devices or cavitating devices, in serial flow relation with the centrifugal pump, thereby providing the required degrading function. However, such additional degrading structures are undesirable due to the additional fuel system complexity and additional failure potentials introduced therewith. In addition, such additional degrading structures typically require a significant increase in engine power extracted and often cause the fuel temperature to rise unacceptably, e.g., to levels over 300° F. at the fuel nozzles.

Thus, it would therefore be desirable to provide a conventional centrifugal fuel pump having the capability to degrade antimisting fuel. More particularly, it would be desirable to provide such a pump having the capability to pump fuel at the pressure and flow levels required in gas turbine engine applications, such as aircraft applications, as well as the capability to simultaneously degrade antimisting fuel.

Accordingly, it is a general object of the present invention to provide improved method and apparatus for degrading antimisting fuel.

It is another object of the present invention to provide such method and apparatus which includes an improved centrifugal pump.

It is another object of the present invention to provide such a centrifugal pump which operates as a relatively high flow range centrifugal pump while degrading antimisting fuel.

It is another object of the present invention to provide such a centrifugal pump having recirculation means for enhancing the degradation of antimisting fuel.

It is another object of the present invention to provide such a centrifugal pump which can be provided through simple modification to a conventional centrifugal pump.

SUMMARY OF THE INVENTION

In carrying out one form of my invention, I provide a method for degrading antimisting fuel. The method includes the step of providing a centrifugal pump of the type having a rotary impeller closely surrounded by a vaned collector. The impeller includes a substantially centrally located input for receiving fuel and an output for directing the fuel outwardly therefrom into an input of the vaned collector. The method includes the step of introducing antimisting fuel into the input of the rotary impeller. The method includes the step of rotating the rotary impeller to create molecular forces in a degradation region disposed substantially between the rotary impeller and the vaned collector wherein the forces are sufficient to degrade the antimisting fuel as the fuel passes through the degradation region into the input of the vaned collector.

BRIEF DESCRIPTION OF THE DRAWINGS

For a better understanding of the invention, reference may be had to the following description, taken in conjunction with the accompany drawings, wherein:

FIG. 1 is a sectional view showing one form of Prior Art centrifugal pump to which applicant's invention relates.

FIG. 2 is a sectional view of a centrifugal pump of the type of FIG. 1.

FIG. 3 is a simplified diagrammatic representation, taken similarly to FIG. 2, showing the manner in which antimisting fuel is degraded in one form of the centrifugal pump of the present invention.

DETAILED DESCRIPTION OF THE INVENTION

Figure 4:
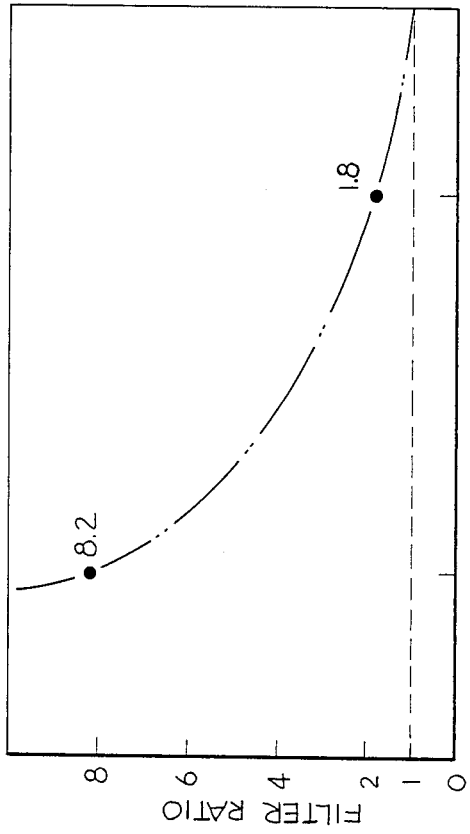
FIG. 4 is a curve showing the degradation characteristics of the Prior Art configuration pump of FIG. 1.

Referring initially to FIG. 1, an exemplary Prior Art centrifugal pump to which applicant's invention relates is generally designated 10. The pump 10 includes a centrally located axial inlet 12 for receiving an input flow of the fuel to be pumped. A rotating impeller wheel 14 is provided and includes a plurality of impeller blades 16 defining impeller blade passageways 19 therebetween. The blades 16 are disposed internally within axially opposing shroud portions 17. A casing 18 is provided and defines a radial outlet 20, which surrounds the tips 16A of the impeller blades 16. A stationary vaned collector 22, e.g., diffuser, surrounds the radial outlet 20 and includes a plurality of stationary diffuser vanes 24. Each pair of the diffuser vanes 24 defines a diffuser entry passage 26 from the radial outlet 20 of the pump 10 to a toroidal shaped collector 27. The impeller wheel 14 extends from a rotatable shaft 28, coupled for rotation in bearings (not shown). As will become apparent from the following description, the present invention may be applied to many types of centrifugal pumps and the structure shown in FIG. 1 is merely meant to be illustrative, and not limiting in any manner.

Referring now to FIG. 2, a portion of the centrifugal pump 10 of FIG. 1 is illustrated, showing one form of applicant's invention. More particularly, the centrifugal pump 10 of FIG. 2 includes a conventional shrouded impeller 14 having a plurality of impeller blades 16. For example, fifteen such impeller blades 16 are shown. Each of the blades 16 is disposed such that rotational velocity is imparted to the fluid (fuel flow) as it flows radially outward through the passage 19 formed by each set of adjacent blades 16.

Circumferentially surrounding the impeller 14 is the stationary diffuser 22, now including certain features of the present invention. The stationary diffuser 22 is separated by a predetermined radial distance d, typically from about 0.010 to about 0.100 inches, from the rotating blade tips 16A of the impeller 14. The diffuser 22 includes a plurality of diffuser entry passages 26. More particularly, in FIG. 2, four such diffuser passageways 26 are shown, substantially equally spaced circumferentially about the diffuser 22. In one such embodiment, where the impeller 14 has a diameter of 3.8 inches, the diffuser inner surface 22S is spaced a distance d of 0.019 inches from the blade tips 16A. The diffuser passageways 26 provide an increase in flow area outwardly so as to deaccelerate the fuel and convert kinetic energy therefrom into static pressure. Each of the diffuser passageways 26 includes an outer surface 26S which is preferably disposed generally tangentially to the circumferential inner surface 22S of the diffuser 22.

The vaned diffuser 22 also includes a plurality of recirculation means 40. More particularly, the diffuser 22 is provided on its circumferential inner surface 22S with a plurality of recirculation channels 40. For example, eight such recirculation channels 40 are shown in FIG. 2. The recirculation channels 40 are substantially equally spaced circumferentially in four pairs of two channels 40 along the inner surface 22S of the diffuser 22. In the form of the invention shown in FIG. 1, two of such channels 40 are disposed between each consecutive pair of diffuser passageways 26. Each such channel 40, and diffuser passageway 26, preferably extend axially to substantially the same distance as the axial width of the impeller tip 16A shown in FIG. 1. The recirculation channels 40 include an outer wall 40S which is preferably disposed generally tangentially to the inner surface 22S of the diffuser 22. The recirculation channels 40 further include a redirecting wall 40R which is preferably disposed generally radially with respect to the center of the impeller 14.

Referring now to FIG. 3, the purpose and function of the form of invention shown in FIG. 2 will be further discussed. For purpose of simplicity, the diagrammatic representation of the invention shown in FIG. 3 includes a limited number of impeller blades 16. Arrow R is intended to depict the direction of rotation of the impeller 14. Arrow O represents the fuel flow output from the diffuser 22. Arrow C is intended to depict an exemplary recirculation fuel flow between the recirculation channels 40 and impeller blade passageways 19.

More particularly, fuel flow enters at the center of the impeller 14 and, through rotation of the impeller 14, discharges through the diffuser passageways 26 (arrow O). To promote the degradation of the antimisting fuel, it is desirable to shear the antimisting fuel in the degradation region X defined by the relatively close clearance space, d, between the impeller blade tips 16A and the diffuser inner circumferential surface 22S. The impeller tip speed is typically relatively high, e.g., between about 250 to about 450 feet per second, preferably at least about 300 feet per second. In this speed range, the molecular forces or stresses are caused to be of sufficient magnitude to cause molecular fragmentation of the antimisting fuel polymer additive, and hence, degradation of the antimisting fuel.

In addition to the stress provided in a single pass of fuel flow through the degradation region disposed between the impeller blade tips 16A and the diffuser 22 and then radially out of the pump, the form of invention, shown in FIGS. 2 and 3, also promotes a high degree of mixing between the degraded and undegraded entering fuel entering the pump. Further, the invention provides for a high number of repetitive shearing events. In this connection, between shearing locations in the degradation region X, the recirculation channels 40 are provided to promote continuity of the recirculation flow and to encourage repetitive shearing events. For example, as shown by the arrows C at the recirculation channels 40, additional shearing events are provided as each of the blade tips 16A shear through the recirculation flow C (see arrows) produced by the recirculation channels 40.

It is important to recognize that the configuration of the recirculation channels 40 are typically selected in accordance with the application involved. It is to be further recognized that the present invention provides means for degrading the antimisting fuel in a centrifugal pump while at the same time providing useful fuel flow and pressure, without requiring excessive energy input or creating unacceptable fuel temperature rise.

EXAMPLES

The invention may be better appreciated by reference now to the following examples. However, it is to be understood that the invention is not limited to the details recited therein.

EXAMPLE #1

In the development of the present invention, a conventional centrifugal fuel pump suitable for aircraft application, substantially the same as the one shown in FIG. 1 (not including recirculation channels) was tested with antimisting fuel. The antimisting fuel comprised JET-A fuel (aircraft grade kerosene) and about 0.3% by weight of Imperial Chemical Industries (ICI) fuel modifier FM-9.

The fuel flow input to the pump was 5991 pounds per hour at cruise rpm and 15759 pounds per hour at takeoff rpm. The pump was rotated at 24558 rpm at cruise and 26015 rpm at takeoff. The pump shaft power was 77 horsepower at cruise rpm and 113 horsepower at takeoff rpm. The pump input to pump output temperature rise was 56° F. at cruise rpm and 26° F. at takeoff rpm. The pressure output of the pump was 1001 psig at cruise rpm and 1121 psig at takeoff rpm.

The antimisting fuel degrading capability of the pump was determined using a standardized method based on the ratio of (1) the time for antimisting fuel to pass through a 17 micron screen divided by (2) the corresponding time for the reference JET-A fuel:

$$\text{Filter Ratio} = \frac{\text{Flow Time (Secs) for Antimisting Fuel Through 17}\mu \text{ Screen}}{\text{Flow Time (Secs) for Jet-}A \text{ Fuel Through 17}\mu \text{ Screen}}$$

A curve showing the fuel degradation characteristics of the pump is shown in dashed line in FIG. 4. As shown, the curve passes through the takeoff and cruise power points with Filter Ratios of 8.2 and 1.8, respectively. It is to be appreciated that completely degraded antimisting fuel would exhibit a horizontal line with a Filter Ratio value of 1, as shown in dashed line, while presently desired antimisting fuel Filter Ratios for aircraft gas turbine engines are not greater than about 2.5 at takeoff and about 1.2 at cruise.

EXAMPLE #2

The pump of EXAMPLE #1 was modified to include the diffuser 22 of FIG. 2, and its associated recirculation channels 40.

This pump was tested under conditions similar to EXAMPLE 190 1. More particularly, the fuel flow to the pump was 5693 pounds per hour at cruise rpm and 15244 pounds per hour at takeoff rpm. The pump was rotated at 24552 rpm at cruise and 25988 rpm at takeoff. The pump shaft power was 89 horsepower at cruise rpm and 128 horsepower at takeoff rpm. The pump input to pump output temperature rise was 70° C. at cruise rpm and 33° F. at takeoff rpm. The pressure output of this pump was 980 psig at cruise rpm and 1090 psig at takeoff rpm.

Figure 5:
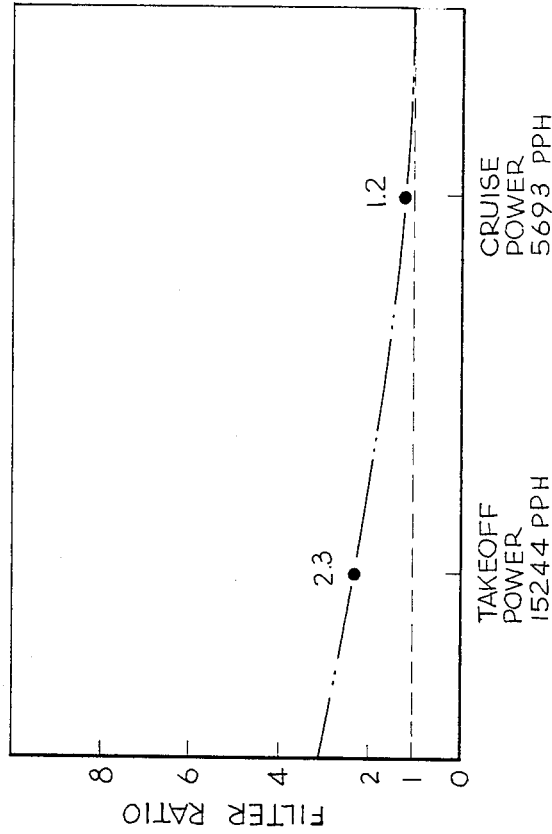
FIG. 5 is a curve showing the degradation chacteristics of the form of centrifugal pump shown partially in FIG. 2.

A curve showing the improved degradation characteristics of this pump is shown in dashed line in FIG. 5. The curve of FIG. 5 passes through the takeoff and cruise power points with Filter Ratios of 2.3 and 1.2, respectively.

Figure 6:
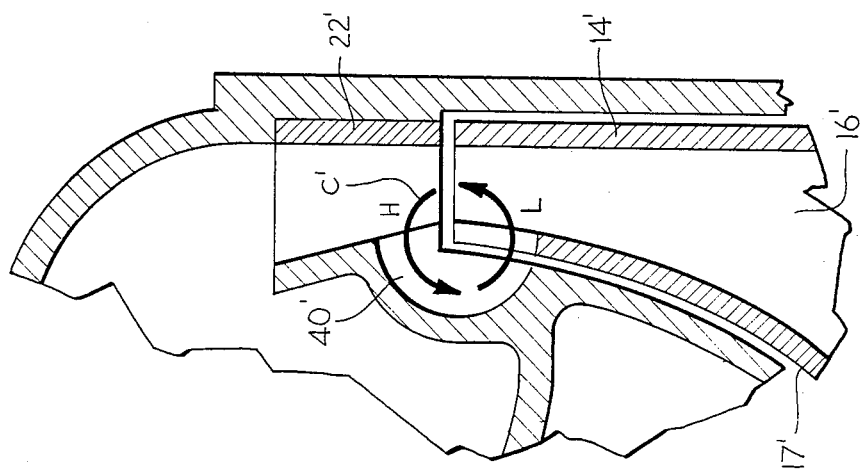
FIG. 6 is a sectional view, taken similarly to FIG. 1, showing a portion of another form of centrifugal pump of the present invention in which an axial recirculation channel is provided.

It is to be appreciated that the degradation characteristics shown in FIG. 6 approach the completely degraded fuel characteristic in the cruise power region, the dominant operating region of an aircraft gas turbine engine.

General Considerations

As discussed earlier, the particular configuration of the antimisting centrifugal fuel pump of the present invention is typically selected for a given application. However, the following guidelines should be considered in selecting a particular configuration. Where increased internal fuel flow recirculation is desired for increased shearing activity, relatively wider impeller blades should be provided as the recirculating flow is increased by the use of wider impeller blades. Further, the provision of higher impeller tip blade angles (more radial at the impeller discharge) tends to increase blade loading, one of the factors promoting the fuel flow recirculation. Also, relatively fewer impeller blades result in higher individual blade loading.

Another form of the invention is partially shown in FIG. 6 wherein, where possible, prime reference numerals (') have been employed to represent corresponding elements to the form of invention shown in FIGS. 2 and 3. As shown in FIG. 6, axially positioned recirculation channels 40' may be provided at the discharge of the impeller 14'. To provide for the resulting axial recirculation flow (C'), the impeller forward shroud 17' is shown radially shortened. It is to be recognized that the axial recirculation channel 40' can replace or augment the radial recirculation channels 40 of FIGS. 2 and 3. The axial recirculation channels 40' provide more recirculation because the fuel moves between a relatively high (H) and low (L) static pressure region of the diffuser 22' and impeller 14', respectively. Of course, the axial recirculation channels 40' may require more power input to the pump for the same level of degradation afforded by the form of the invention shown in FIG. 3.

In view of the foregoing, the optimum design solution for a given application will be the one which yields a maximum amount of recirculation between the impeller discharge and the discharge casing with power losses being confined to promotion of localized recirculation flow near the impeller tip where adequate impeller blade tip velocity is available to produce the molecular forces or stresses needed to degrade the antimisting fuel.

Thus, there is provided by the present invention a centrifugal pump providing an acceptable level of degradation to permit satisfactory engine operation at substantially all conditions. In addition, the antimisting centrifugal fuel pump of the present invention is capable of pumping the fuel at the ordinarily desired speed, e.g., about 25000 rpm, and flow levels while simultaneously providing antimisting fuel degrading capability and desired pressure levels. Further, acceptable increases in extracted engine power and fuel temperature rise is provided in the antimisting centrifugal fuel pump of the present invention. Also, no additional compromises to the safety, reliability or cost aspects are encountered in operating the aircraft or engine with the antimisting centrifugal pump of the present invention.

In the present invention, apparatus and methods are provided for degrading antimisting fuel. In particular, antimisting fuel is guided into a rotating impeller and by means of change of fluid angular momentum, raised to a higher level of static and dynamic pressure at the impeller discharge tip. Then, by means of interaction between the impeller and a stationary device surrounding the impeller, molecular forces or stresses cause degradation of the antimisting fuel. Further, a secondary flow field or recirculation between the impeller and surrounding stationary device promotes additional degradation as a result of repetition of the degradation mechanisms.

The antimisting fuel pump of the present invention may, for example, be mounted to the engine or located between the aircraft fuel and the engine fuel inlet. The means for driving the antimisting fuel pump may, for example, comprise the engine shaft, gearbox power, an electric motor, a pneumatic drive, or hydraulic drive.

Further, although the method and apparatus of the present invention have been described in connection with a conventional centrifugal pump having a shrouded impeller, the invention is generally applicable to other forms of centrifugal pumps. In addition, the size and configuration of the centrifugal pumps of the present invention, as hereinbefore described, are exemplary and not intended to be limiting in any manner. For example, an important advantage of the method and apparatus of the present invention is that the invention can be practiced through simple modification to conventional centrifugal pumps. In this connection, for many applications, it is preferable to employ the existing conventional centrifugal pump and make the simplest modification thereto so as to provide the degradation region which is required for the involved application and antimisting fuel.

While the present invention has been described with reference to specific embodiments thereof, it will be obvious to those skilled in the art that various changes and modifications may be made without departing from the invention in its broader aspects. It is contemplated in the appended claims to cover all such variations and modifications which come within the true spirit and scope of my invention.

What I claim as new and desire to be secured by Letters Patent of the United States Patent and Trademark Office is:

1. Apparatus for degrading antimisting fuel, the apparatus including a centrifugal pump having a rotary impeller with a substantially centrally located input for receiving fuel and being closely surrounded by a vaned collector for receiving fuel from an output of the rotary impeller, the rotary impeller including a plurality of radial impeller blades, which comprises:
   recirculation means for repetitively directing some of the fuel which passes from said rotary impeller to said vaned collector back to said impeller for enhancing the degradation of said fuel.

2. Apparatus in accordance with claim 1 in which said recirculation means comprises a plurality of recirculation channels in said vaned collector.

3. Apparatus in accordance with claim 2 in which said vaned collector comprises a diffuser having a plurality of diffuser passageways.

4. Apparatus in accordance with claim 3 in which said diffuser includes a generally circumferential inner surface spaced a predetermined distance from said rotary impeller blades and said recirculation channels are disposed along said inner surface, said recirculation channels being generally radially aligned with said rotary impeller.

5. Apparatus in accordance with claim 4 in which said recirculation channels include an outer wall disposed generally tangentially to said inner surface of said diffuser and a redirecting wall disposed generally radially with respect to said rotary impeller.

6. Apparatus in accordance with claim 5 in which said diffuser passageways are substantially equally spaced circumferentially along said inner surface of said diffuser.

7. Apparatus in accordance with claim 6 in which at least one of said recirculation channels is disposed between each consecutive pair of said diffuser passageways.

8. Apparatus in accordance with claim 7 in which at least one pair of said recirculation channels is disposed between each consecutive pair of said diffuser passageways.

9. Apparatus in accordance with claim 8 in which said diffuser includes four diffuser passageways and eight recirculation channels, said recirculation channels being substantially equally spaced circumferentially in four pairs of said channels, each of said pairs of channels being disposed between each consecutive pair of diffuser passageways.

10. In a centrifugal pump having an impeller which bears blades and which rotates within a casing, there being a clearance between the blades and the casing, the improvement comprising:
   (a) recirculation means in the casing which cause the clearance between a selected blade and the casing to change during rotation, the change having no substantial function other than to recirculate fluid between the recirculation means and the blade, thereby subjecting the fluid to repeated shearing events.

11. In a centrifugal pump in which an impeller receives fluid from an inlet and drives the fluid radially outward toward two or more diffusers which receive the fluid and conduct the fluid to one or more outlets, the improvement comprising:
   (a) a plurality of recirculators which are unconnected with the outlets and which receive outwardly travelling fluid and return received fluid toward the impeller.

12. A degrader for fuel which contains an anti-misting component, comprising:
   (a) a centrifugal pump which contains
      (i) an inlet;
      (ii) an impeller for receiving fuel from the inlet and which drives fuel in a radially outward direction;
      (iii) a casing around and spaced from the impeller which contains openings for receiving fuel and for conducting fuel toward an outlet; and
      (iv) a plurality of recirculation means in the casing which are unconnected with any outlet and which provides improved fuel recirculation over the recirculation inherently present in the space between the impeller and the casing.

* * * * *